United States Patent
VanDeWeert et al.

(10) Patent No.: US 11,255,718 B2
(45) Date of Patent: *Feb. 22, 2022

(54) SYSTEMS AND METHODS FOR EXTENDING FREQUENCY RESPONSE OF RESONANT TRANSDUCERS

(71) Applicant: Kulite Semiconductor Products, Inc., Leonia, NJ (US)

(72) Inventors: Joe VanDeWeert, Maywood, NJ (US); Adam Hurst, New York, NJ (US); Joseph Carter, League City, TX (US); Douglas R. Firth, Ithaca, NY (US); Alan R. Szary, Ithaca, NY (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 181 days.

This patent is subject to a terminal disclaimer.

(21) Appl. No.: 15/929,574

(22) Filed: May 11, 2020

(65) Prior Publication Data

US 2020/0271510 A1  Aug. 27, 2020

Related U.S. Application Data

(63) Continuation of application No. 14/528,847, filed on Oct. 30, 2014, now Pat. No. 10,697,827.

(60) Provisional application No. 62/012,764, filed on Jun. 16, 2014.

(51) Int. Cl.
| | |
|---|---|
| *G01H 13/00* | (2006.01) |
| *G01H 11/08* | (2006.01) |
| *G01L 9/06* | (2006.01) |
| *G01L 9/00* | (2006.01) |

(52) U.S. Cl.
CPC ............ *G01H 13/00* (2013.01); *G01H 11/08* (2013.01); *G01L 9/065* (2013.01); *G01L 9/0047* (2013.01)

(58) Field of Classification Search
CPC ........ G01H 13/00; G01H 11/08; G01L 9/065; G01L 9/0047
See application file for complete search history.

(56) References Cited

U.S. PATENT DOCUMENTS

| | | |
|---|---|---|
| 5,960,091 A | 9/1999 | White et al. |
| 2003/0199997 A1 | 10/2003 | Gao |

(Continued)

OTHER PUBLICATIONS

Transducer-Response-Equalization. (sem.org-IMAC-XXVI-Conf-s22Ap01).

*Primary Examiner* — Regis J Betsch
*Assistant Examiner* — Jeremy A Delozier
(74) *Attorney, Agent, or Firm* — Troutman Pepper Hamilton Sanders LLP; James E. Schutz; Mark Lehi Jones

(57) ABSTRACT

Certain implementations of the disclosed technology may include systems and methods for extending a frequency response of a transducer. A method is provided that can include receiving a measurement signal from a transducer, wherein the measurement signal includes distortion due to a resonant frequency of the transducer. The method includes applying a complementary filter to the measurement signal to produce a compensated signal, wherein applying the complementary filter reduces the distortion to less than about +/−1 dB for frequencies ranging from about zero to about 60% or greater of the resonant frequency. The method further includes outputting the compensated signal.

20 Claims, 14 Drawing Sheets

(56) References Cited

U.S. PATENT DOCUMENTS

| | | | |
|---|---|---|---|
| 2005/0017799 A1* | 1/2005 | Risbo | H03F 3/217 |
| | | | 330/10 |
| 2005/0132815 A1* | 6/2005 | Claude | G04G 21/02 |
| | | | 73/756 |
| 2010/0242603 A1 | 9/2010 | Miller et al. | |
| 2011/0058700 A1* | 3/2011 | Clements | H04R 1/02 |
| | | | 381/351 |
| 2011/0261652 A1* | 10/2011 | Horsky | B06B 1/0253 |
| | | | 367/97 |
| 2015/0053575 A1* | 2/2015 | Bridges | G01N 27/302 |
| | | | 205/787.5 |
| 2015/0101085 A1* | 4/2015 | Paige | G05B 5/01 |
| | | | 850/8 |
| 2016/0014486 A1* | 1/2016 | Macours | H04R 3/007 |
| | | | 381/111 |

\* cited by examiner

SYSTEMS AND METHODS FOR EXTENDING FREQUENCY RESPONSE OF RESONANT TRANSDUCERS

RELATED APPLICATIONS

This application is a continuation under 35 U.S.C. § 120 of U.S. patent application Ser. No. 14/528,847, filed 30 Oct. 2014, published as U.S. Patent Publication No. US20150365072 on 17 Dec. 2015, and entitled: "Systems and Methods for Extending Frequency Response of Resonant Transducers." U.S. patent application Ser. No. 14/528,847 claims priority to U.S. Provisional Patent Application Ser. No. 62/012,764, filed on Jun. 16, 2014, entitled: "Systems and Methods for Extending Frequency Response of Resonant Transducers," the contents of which are hereby incorporated by reference in their entirety as if presented herein in full.

TECHNICAL FIELD

The disclosed technology relates to transducers and more particularly to systems and methods for extending frequency response of resonant transducers.

BACKGROUND

The measurement of high frequency physical parameters is often made more difficult by the presence of resonances within the measurement system. It is relatively easy to build a transducer capable of measuring the low frequency (<5 kHz) phenomena with little or no distortion. However, for higher frequencies (typically >5 kHz for pressure and >20 kHz for vibration) it is difficult to make a transducer that does not begin to distort the signal due to internal resonances or resonances caused by the interaction of the transducer and the system to be measured.

BRIEF SUMMARY

Some or all of the above needs may be addressed by certain embodiments of the disclosed technology.

According to an example implementation of the disclosed technology, a method is provided that can include receiving a measurement signal from a transducer, wherein the measurement signal includes distortion due to a resonant frequency of the transducer. The method includes applying a complementary filter to the measurement signal to produce a compensated signal, wherein applying the complementary filter reduces the distortion to less than about +/−1 dB for frequencies ranging from about zero to about 60% of the resonant frequency. The method further includes outputting the compensated signal.

Certain example implementations of the disclosed technology include a filter. The filter may include an input terminal configured to receive a measurement signal from a transducer, wherein the measurement signal includes distortion due to a resonant frequency associated with the transducer. In certain example implementations, the filter may include a compensation circuit configured to reduce the distortion of the measurement circuit to less than about +/−1 dB for frequencies ranging from about zero to about 60% or greater of the resonant frequency. The filter may include an output terminal adapted to output the compensated signal.

Certain example implementations of the disclosed technology may include a transducer that is compensated to reduce effects of natural resonances associated with the transducer. In certain example implementations, the transducer may include a diaphragm, one or more piezoresistors, a piezoelectric crystal, and/or capacitive elements in communication with the diaphragm. In certain example implementations, the transducer may include a seismic mass in communication with one or more piezoresistors, a piezoelectric crystal, and/or capacitive elements. The transducer may also include a housing that can include one or more of a cavity, a mounting substrate, mounting screws, etc. The compensated transducer may include a complementary filter configured to receive a measurement signal from the transducer wherein the measurement signal includes distortion due to a resonant frequency associated with the transducer. The complementary filter may further reduce the distortion to less than about +/−1 dB for frequencies ranging from about zero to about 60% or greater of the resonant frequency, and output the compensated signal.

Other embodiments, features, and aspects of the disclosed technology are described in detail herein and are considered a part of the claimed disclosed technology. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1A:
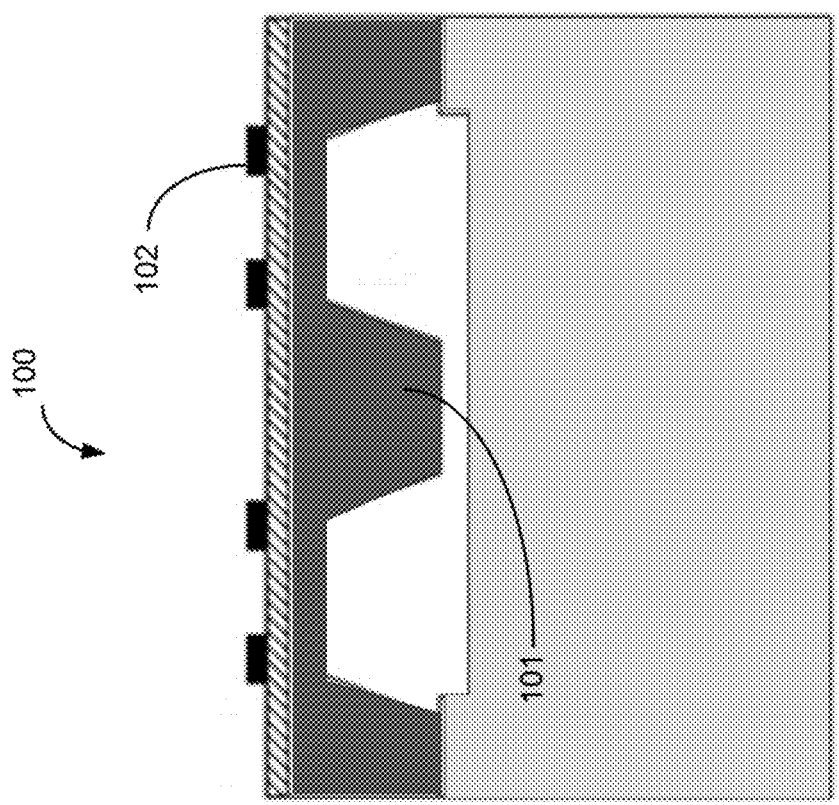
FIG. 1a depicts a cross section of a typical piezoresistive pressure transducer.

Some implementations of the disclosed technology will be described more fully hereinafter with reference to the accompanying drawings. This disclosed technology may, however, be embodied in many different forms and should not be construed as limited to the implementations set forth herein.

Certain implementations of the disclosed technology may enable reducing the influence of internal (or external) resonances on the measurement of a system through the use of active filtering of the analog signal.

There are several sources of resonance in pressure transducers, microphones, and accelerometers. Typically, a pressure transducer is made using a deflecting diaphragm. The deflection of this diaphragm can be measured by piezoresistors, a piezoelectric crystal, or by a capacitive measurement. The diaphragm has an associated resonant frequency and as the measurement frequency of interest approaches this resonance frequency, the resulting measurement signal may be distorted due to the influence of the diaphragm's resonance frequency. Other factors, including but not limited to the transducer's component sizes, packaging, materials, associated cavities, etc. can further influence the resonance characteristics. If the resonance is under damped it will amplify the signal and if it is critically or over damped it will attenuate it.

In certain example embodiments, the mounting of the transducer can affect the resonance. For example, in some cases, the transducer has a protective screen that creates a cavity between the screen and diaphragm. In other cases, the mounting of the transducer in the system creates its own cavity. In either case, this cavity has a characteristic resonance approximated by either the classic organ pipe formulae or a Helmholtz resonator. In most but not all cases, this cavity resonance can be significantly lower than the diaphragm resonance and so it may be of importance in the system response.

Similarly, accelerometers in general have a seismic mass whose movement may be sensed by piezoresistors or by a piezoelectric crystal. This seismic mass typically has a characteristic resonance. The mounting of the accelerometer can also cause a resonance, although if the accelerometer is hard mounted, this resonance may not be as critical as typically this resonance is much higher than the frequencies of interest.

The disclosed technology provides example implementations for measuring resonances in the transducer and to characterize them through the calculation of a resonant frequency (fn) and quality factor (Q). These two numbers allow for a complementary filter to be calculated and used to cancel out the resonance of the system. In some cases, the complementary filter may be utilized to cancel out the resonance up to the resonant frequency of the system. Certain example implementations of the disclosed technology allow for a flat response of the transducer system up to a much higher level than would otherwise be possible.

In certain example implementations, filtering can be done in software using a series of digital filters, but it is highly advantageous to use analog filtering before the analog to digital conversion to increase resolution of the measurement. Additionally, the application of a higher order digital filter required to flatten the dynamic response of any transducer may be time consuming and may significantly increase the complexity of post-acquisition data analysis.

Figure 1B:
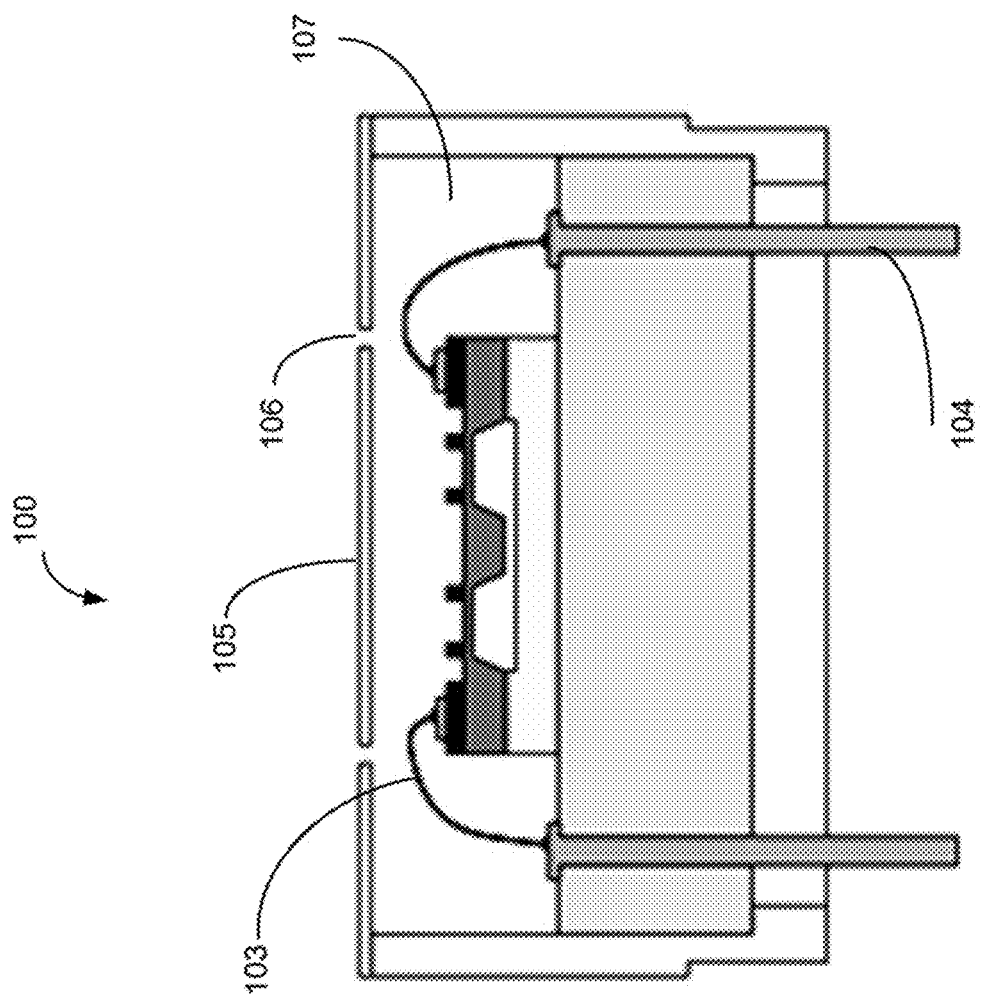
FIG. 1b depicts a typical piezoresistive pressure transducer with a screen.
Figure 1C:
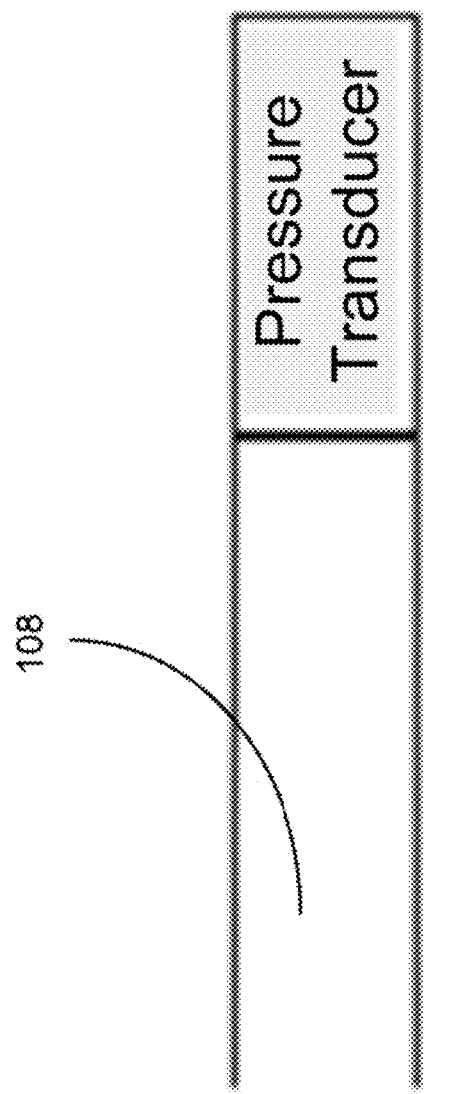
FIG. 1c depicts a typical pressure transducer installation.

FIGS. 1a-1c shows several different causes of resonances in a typical pressure transducer. FIG. 1a shows a cross section of a typical piezoresistive pressure transducer 100. For example, in one implementation, a micromachined silicon diaphragm 101 may deflect under the action of a pressure wave. In an example implementation, a series of piezoresistors 102 may be utilized to measure the deflection of this diaphragm.

FIG. 1b show a typical piezoresistive pressure transducer 100 (as in FIG. 1a) with additional housing elements such as a screen 105 and various electrical components that may be utilized to transmit the electric signal (for example, as generated via the series of piezoresistors 102 as shown in FIG. 1a) through wire conductors 103 and metal pins 104. In certain example implementations, the screen 105 may include many small holes 106. In certain example implementations, a cavity 107 may be formed between the screen 105, the diaphragm, (for example, the diaphragm 101 of FIG. 1a) and other portions of the transducer housing. The small holes 106 in the screen 105, plus the cavity 107 may create a modified Helmholtz resonance as detailed in "An Experimental Frequency Response Characterization of MEMS Piezoresistive Pressure Transducers" Proceeding of ASME Turbo Expo 2014 GT2014-27159.

In an example implementation, the resonant frequency of the diaphragm may be modeled by $$f = \frac{36}{2\pi} \sqrt{\frac{Et^2}{12\rho a^4 (1 - v^2)}}$$

for a flat square diaphragm with length a and thickness t, where E is Young's modulus. In certain example implementations, v is Poisson's ratio of the diaphragm material, and ρ is the applied pressure (Pascal).

The resonance of the transducer may be further influenced by mounting configurations and surrounding structures. For example, FIG. 1c shows a typical pressure transducer installation. In this example, the pressure transducer may be installed on the surface of a model, but it is slightly recessed to protect the front end of the transducer. This creates a small organ pipe 108 which has a resonance given by $$f = \frac{c}{4L}$$

where c is the speed of sound in the medium and L is the length of the organ pipe.

Figure 2A:
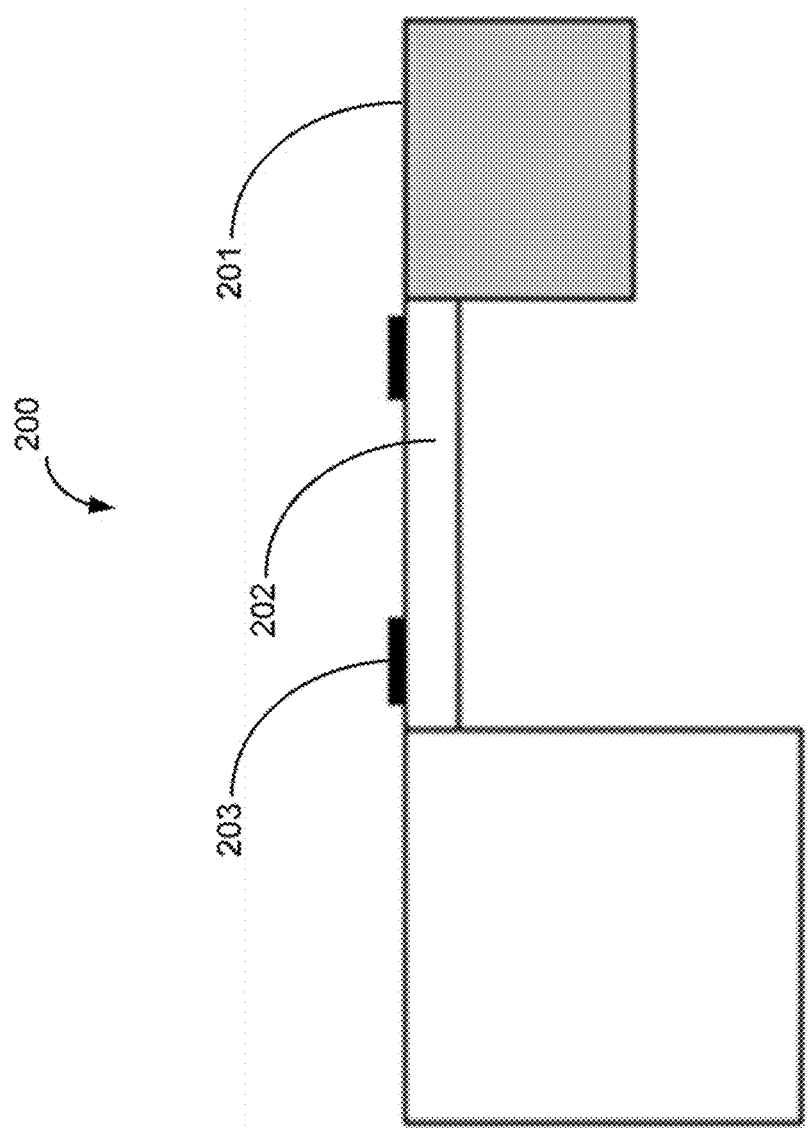
FIG. 2a depicts a cross sectional view of a typical micromachined accelerometer.

FIG. 2a shows another example of how a physical configuration may influence a resonance of a measurement system. For example, a cross section of a typical micromachined accelerometer 200 is shown in FIG. 2a. In an example implementation, the accelerometer 200 may include a seismic mass 201 supported by a cantilever beam 202. The deflection of this beam 202 may be measured by a series of piezoresistors 203. According to an example implementation of the disclosed technology, the beam mass system has a natural frequency given by $$f = \frac{1.732}{2\pi} \sqrt{\frac{EI}{Ml^3}}$$

where I is the moment of inertia of the beam, M the mass of the seismic mass, E the Young's Modulus, and l is the length of the beam. As with the previous examples, if the measurement frequency range of interest is near the natural frequency of the system, distortions due to the influence of the natural frequency may render the measurement output inaccurate.

Figure 2B:
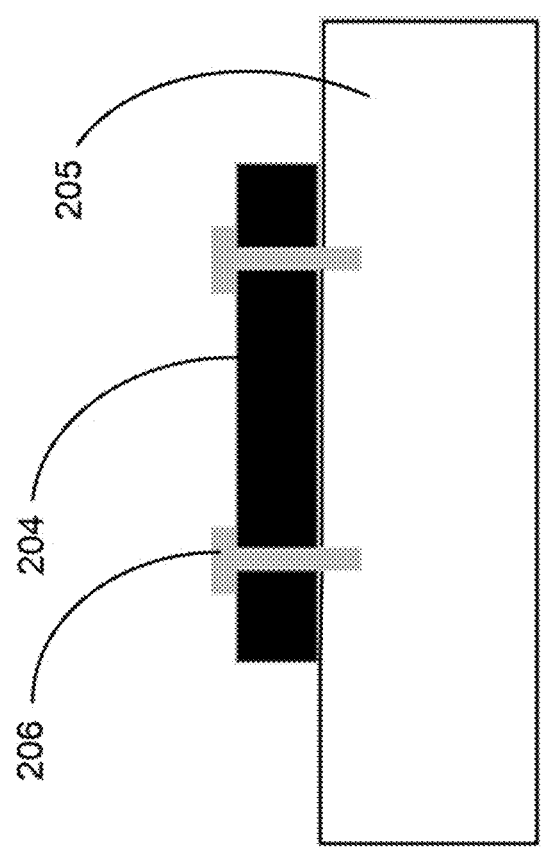
FIG. 2b depicts a typical installation of an accelerometer.

FIG. 2b shows a typical mounting installation of an accelerometer 204. In an example implementation, the accelerometer 204 may be attached to the body 205 of the device under test. For example, the accelerometer 204 may be attached to body 205 of the device under test using screws 206. The mass of the accelerometer and the spring force of the screws creates a resonance with a frequency of $$f = \frac{1}{2\pi}\sqrt{\frac{k}{m}}$$

where k is the spring constant of the screws and m is the mass of the accelerometer.

Although the resonant frequency of the systems described above is fairly straightforward to estimate, it can be difficult to estimate the quality factor of the resonance. This depends on the damping of the system, which can depend on the material properties of all the different components, the viscosity of the medium to be tested, and the surface roughness of the various passages. These are very difficult to measure accurately and can vary substantially among otherwise similar transducers. Therefore, it is important to measure the properties of the resonance whenever possible. In certain situations, it may be advisable to measure the frequency response of the transducer after it is packaged or otherwise integrated into an enclosure. In certain situations, it may be advisable to measure the frequency response of the packaged transducer after it is mounted within the system to be measured.

Figure 3:
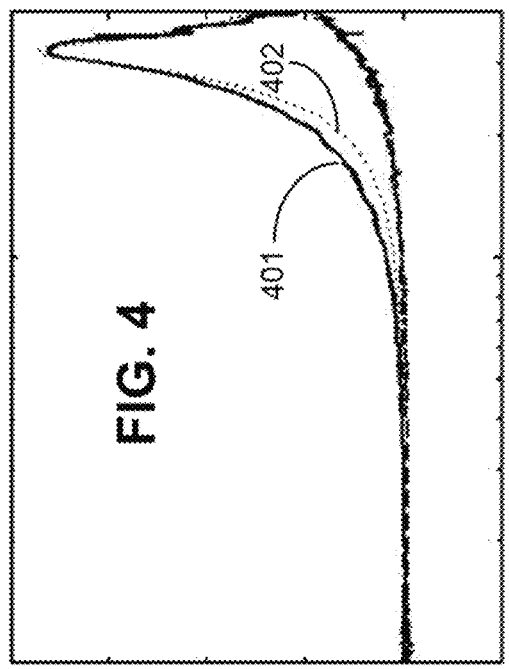
FIG. 3 shows the typical resonance curves for two different pressure transducer configurations.

FIG. 3 shows typical resonance curves for two different pressure transducer configurations. The first curve 301 is for a small circular pressure transducer with a typical screen configuration. The second curve 302 shows the resonance for the same transducer with a room temperature vulcanizing silicone (referred to as RTV herein) fill under the screen to reduce the volume cavity.

Figure 4:
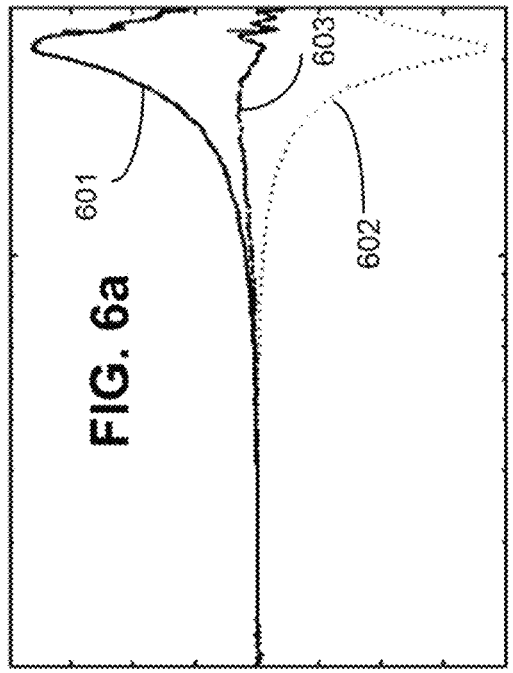
FIG. 4 shows curve fits to responses for various pressure transducer configurations.

Even though the parameters of the resonances vary considerably, they can all be well modeled by a second order under-damped system. FIG. 4, for example, shows a curve fit 402 to a measured resonance curve 401 for a small circular pressure transducer with a typical screen configuration. For each configuration the system response may be well modeled up to and past resonance using the equation:

$$T(f) = \frac{-f^2 + iff_n + f_n^2}{-f^2 + \frac{iff_n}{Q} + f_n^2}$$

where f is the frequency, fn is the resonant frequency, and Q is the quality factor.

Figure 5:
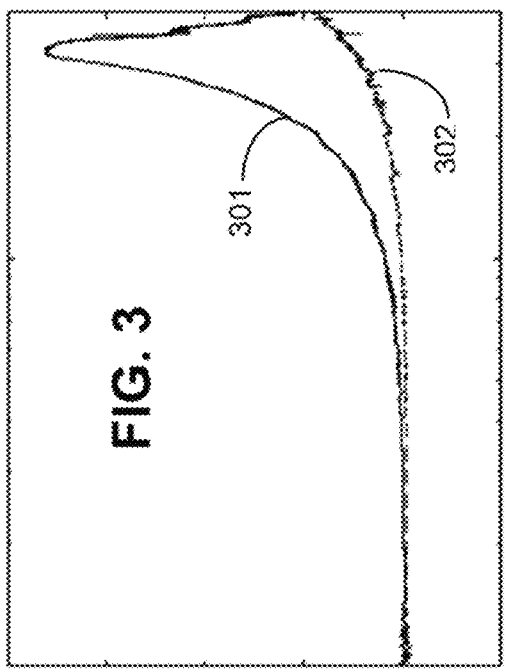
FIG. 5 shows curves for a complementary filter design, according to an example implementation of the disclosed technology.

Using the calculated parameters, the complementary filter may be calculated, as shown in FIG. 5. For example, FIG. 5 shows a calculated complementary filter curve 502 for the measured response curve 501 corresponding to a screen transducer embodiment. FIG. 5 also depicts a calculated complementary filter curve 504 for the measured response curve 504 corresponding to a RTV filled screen transducer embodiment.

The complementary filter transfer function for the Helmholtz resonance may be represented by the inverse of the second order transfer function model of the sensor, and may be represented by the equation $$T_C(f) = \frac{-f^2 + \frac{iff_n}{Q} + f_n^2}{-f^2 + iff_n + f_n^2}.$$

Since the sensor Q and resonant frequency $f_n$ are variable, it may be desirable for the filter to accommodate programmable entries of Q and $f_n$.

Figure 6A:
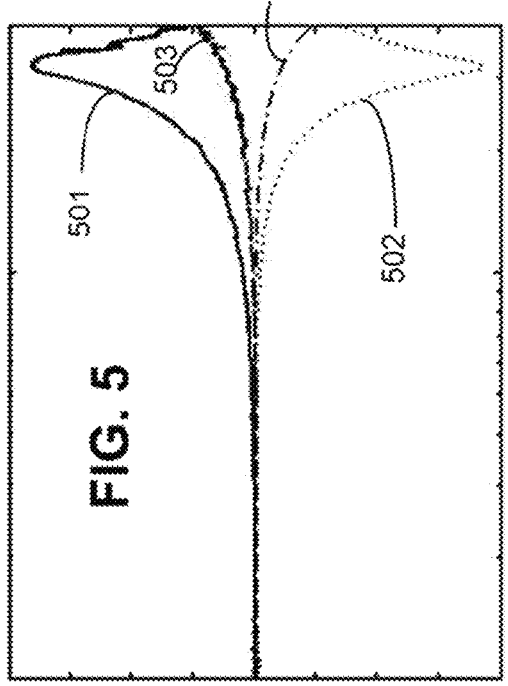
FIG. 6a shows frequency response curves for a transducer with a screen 601, the complementary filter 602, and the resultant response of the system 603, according to an example implementation of the disclosed technology.
Figure 6B:
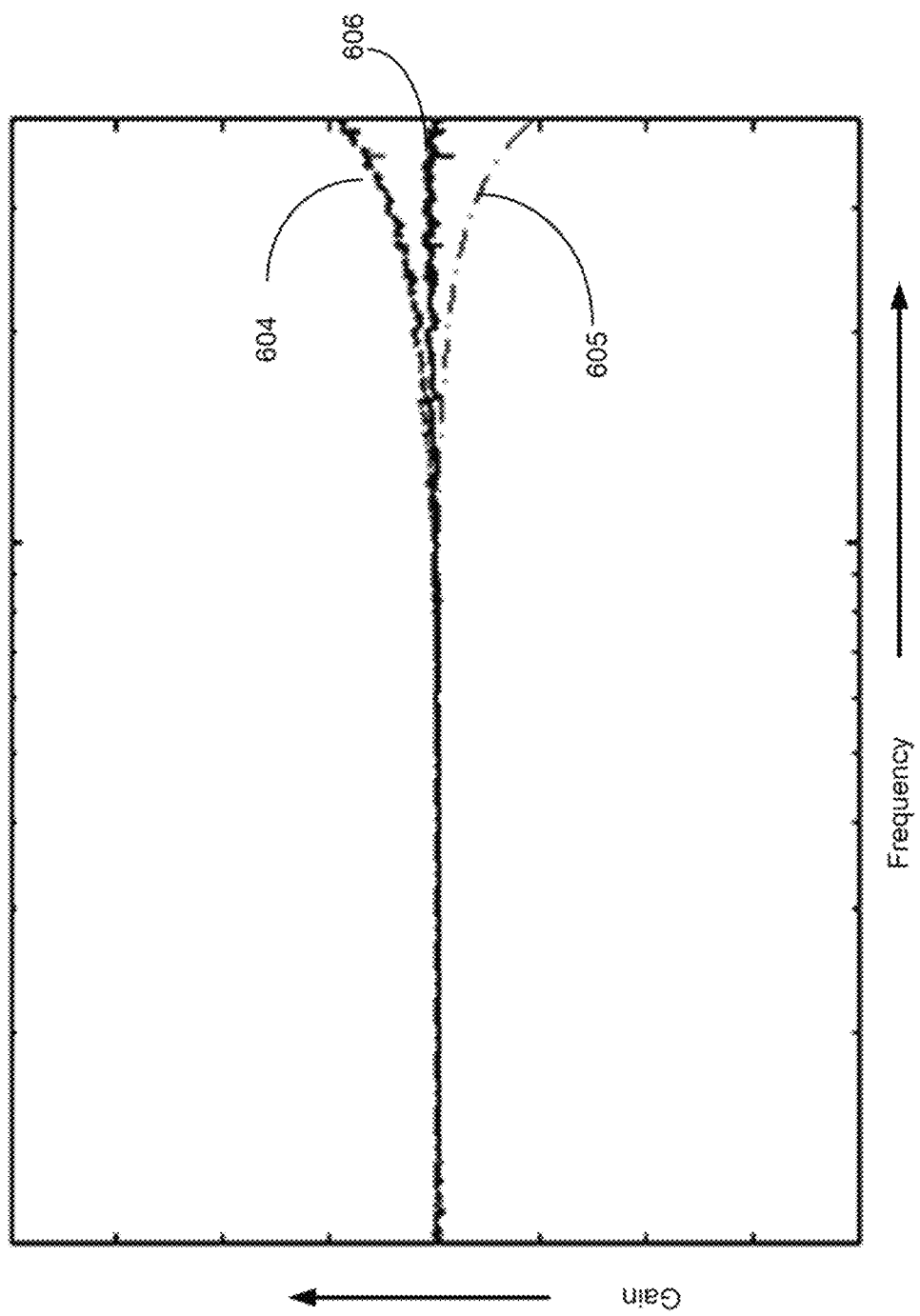
FIG. 6b shows similar results for the transducer as shown in FIG. 6a, but with RTV as a cavity filler.

FIGS. 6a-6b show that when these complementary filters are used with the known resonance, a flat response may be achieved up to a frequency that is much higher than would otherwise be achievable. FIG. 6a, for example, shows the frequency response curve 601 for a transducer with a screen, the curve 602 for the complementary filter, and the resultant response curve 603 of the system utilizing the complementary filter. It is clear that the response of the system is well within a flat (+/−1 dB) response up to nearly 80% of the resonant frequency as compared to approximately 20% in the non-filtered system. FIG. 6b shows similar results for the transducer with RTV. For example, shown is the frequency response curve 604 for a transducer with RTV, the curve 605 for the complementary filter, and the resultant response curve 606 of the system utilizing the complementary filter.

Figure 7:
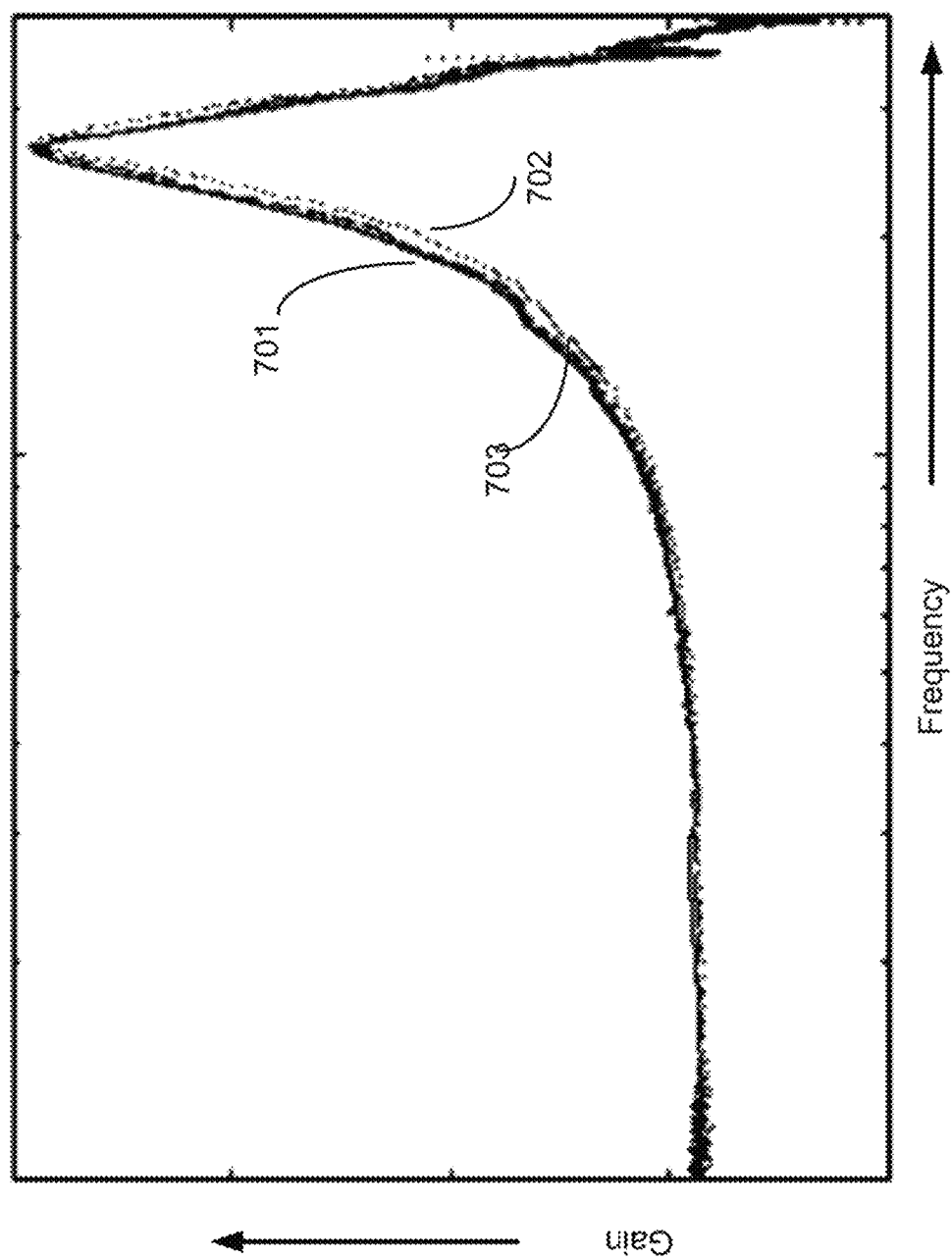
FIG. 7 shows frequency responses for several different transducers with similar front ends.

According to an example implementation of the disclosed technology, and to achieve the best possible response, it may be necessary to measure each transducer to be used separately to obtain a unique natural frequency and Q. However if the desired flat response does not need to approach the natural frequency it is possible to use the same complementary filter for a whole family of transducers. FIG. 7, for example, shows the frequency response curves 701 702 703 for several different (standard screen) transducers with similar front ends. As may be appreciated by the frequency response curves 701 702 703, the same curve fit may be well matched to all three transducers, meaning that the same complementary filter may be utilized in this situation to give a flat frequency response to at least 80% of the resonant frequency.

According to an example implementation of the disclosed technology, complementary filtering may be achieved with an analog filter before the data acquisition. According to another example implementation of the disclosed technology, complementary filtering may be achieved with a digital filter after data acquisition. One skilled in the art may recognize that digital filtering may be simpler than analog filtering to implement because it may be easy to configure a different digital filter for each transducer channel. However, digital filtering, as applied herein may have an associated drawback that makes the analog filter the preferred embodiment for most applications. For example, when a digital filter is used, it is typically preferable to acquire the data that has been distorted by the resonance of the transducer. The resonances can create amplification of at least 10 and sometimes over 100 times the real measured value at 80% of resonance. Therefore, the gain of any amplifiers (and the range of the data acquisition systems) may be adjusted to acquire these distorted signals without saturating the amplifier (either positively or negatively). This means that the resolution of the system may need to be 10 to 100 times greater than would be necessary, or conversely, the measurement may suffer a loss of 10 to 100 times the resolution of a pre-filtered system resulting in an unrecoverable loss of 20 dB to 40 dB of dynamic range within the frequency band of interest.

Figure 8:
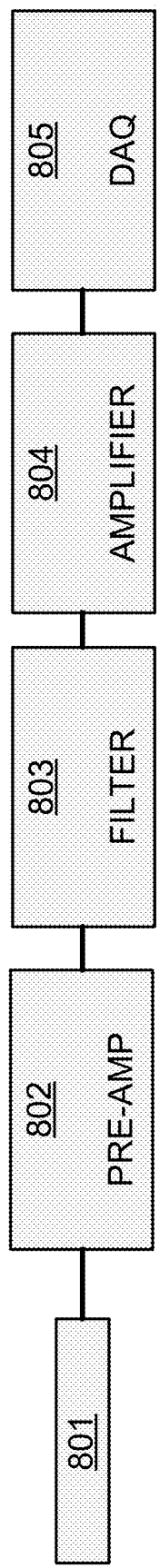
FIG. 8 depicts a system according to an example implementation of the disclosed technology.

FIG. 8 shows an example embodiment of the system. In an example implementation, an electrical signal generated by the transducer under test 801 may be fed to a preamplifier 802. In one example implementation, preamplifier 802 may be configured with a gain of between about 2 to a gain of about 5. In certain example implementations, the pre-amplifier 802 may be a buffer so that the active filters do not put an unnecessary load onto the transducer, but the gain is small enough that there is no worry of saturating the system even near resonance. According to an example implementation of the disclosed technology, the signal from the preamplifier 802 may be fed to an active filter 803. In an example implementation, the active filter 803 may be configured to compliment the frequency response of the transducer 801. In certain example implementations, this filter stage can also contain an anti-aliasing filter to avoid aliasing of higher frequency signals that are not of interest in the test.

In an example implementation, the signal from the active filter 803 may then be fed into a post amplifier 804. In an example implementation, the post amplifier 804 may increase the amplitude of the signal after the resonant peak has been flattened so that there is less risk of saturating the system. In certain example implementations, the gain of the post amplifier 804 may be much higher (for example, the total gain of the system may be between about 550 and about 1000). According to an example implementation of the disclosed technology, the signal from the post amplifier 804 may be fed to a data acquisition system 805 at a level matched to the available signal input range. In certain example implementations, the data can then be post filtered, if desired, to remove any small distortions that are left.

Figure 9:
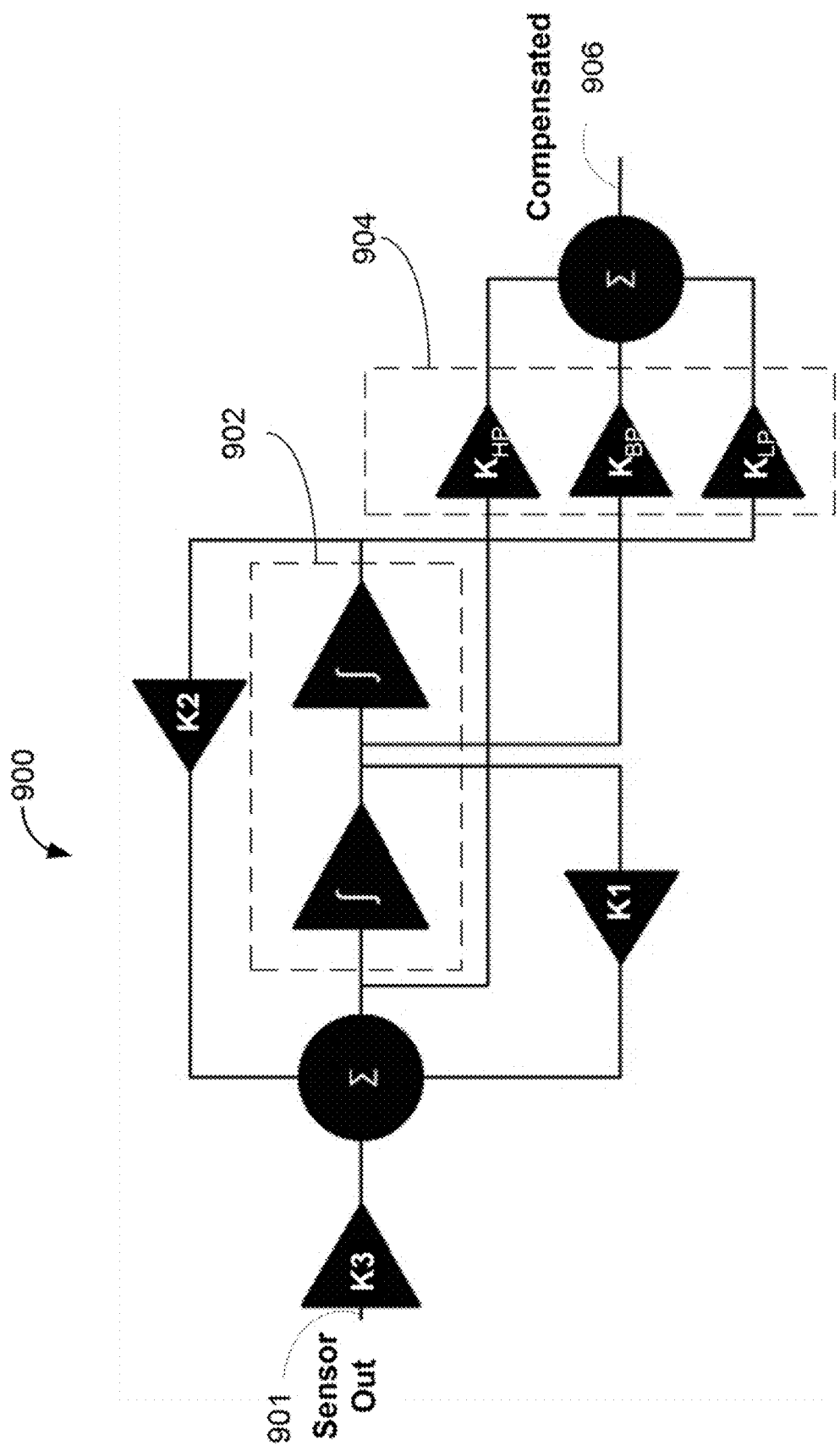
FIG. 9 depicts a block diagram of a sensor cavity resonance compensator, according to an example implementation of the disclosed technology.

FIG. 9 depicts a block diagram of a complementary compensating filter 900, according to an example implementation of the disclosed technology. As depicted, the sensor output 901 may be processed by the compensating filter 900 to produce a compensated output 906. In an example implementation, a second order transfer function of the compensating filter 900 may be implemented by a double integrator 902 with appropriate feedback (K1, K2) to realize the denominator of the transfer function. In an example implementation, the numerator may be realized by weighting of the second order high-pass, band-pass and low-pass filter outputs, each multiplied by their respective constants 904, $K_{HP}$, $K_{BP}$ and $K_{LP}$. As depicted in FIG. 9, the three filter outputs may then be summed to form the final compensated transfer function.

Figure 10:
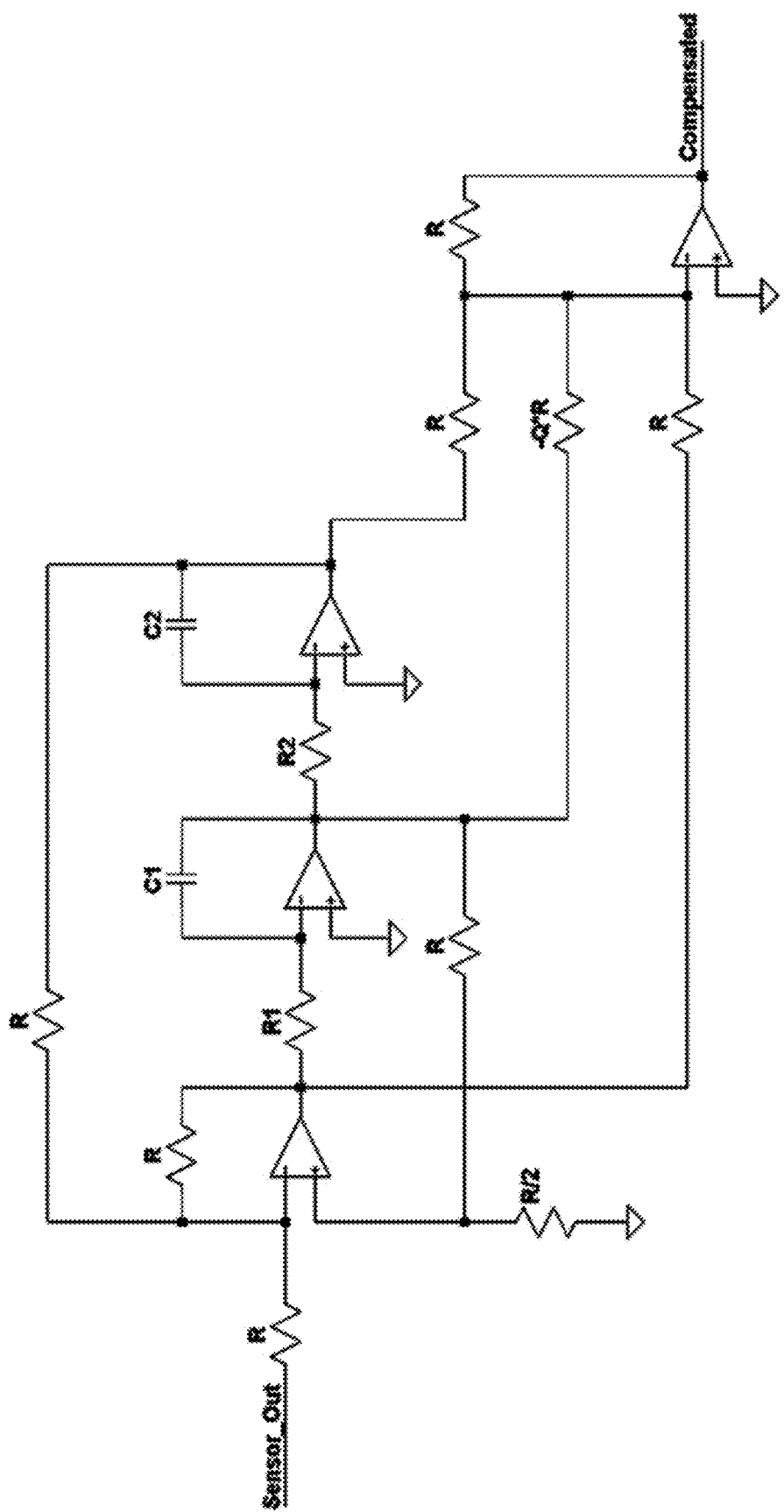
FIG. 10 depicts a sensor cavity resonance compensator circuit, according to an example implementation of the disclosed technology.

FIG. 10 shows an example implementation of a Helmholtz compensator using op-amps and passive components. In this example implementation, the feedback constant K1 is set to ½ and K2 is set to 1. The sensor resonant frequency compensation is controlled by the R1C1 and R2C2 products. The sensor Q compensation is controlled by the weighting of the three filter outputs as shown.

To compensate for the resonant frequency of an accelerometer based on movement of a seismic mass, the transfer function of the compensator may take the form $$T_C(f) = \frac{-f^2 + \frac{i f f_n}{Q} + f_n^2}{f_n^2}.$$

As with the Helmholtz compensator, the sensor Q and resonant frequency $f_n$ are dependent on the characteristics of the sensor being compensated. Accordingly, certain example implementations of the filter may accommodate programmable entries for Q and $f_n$.

Figure 11:
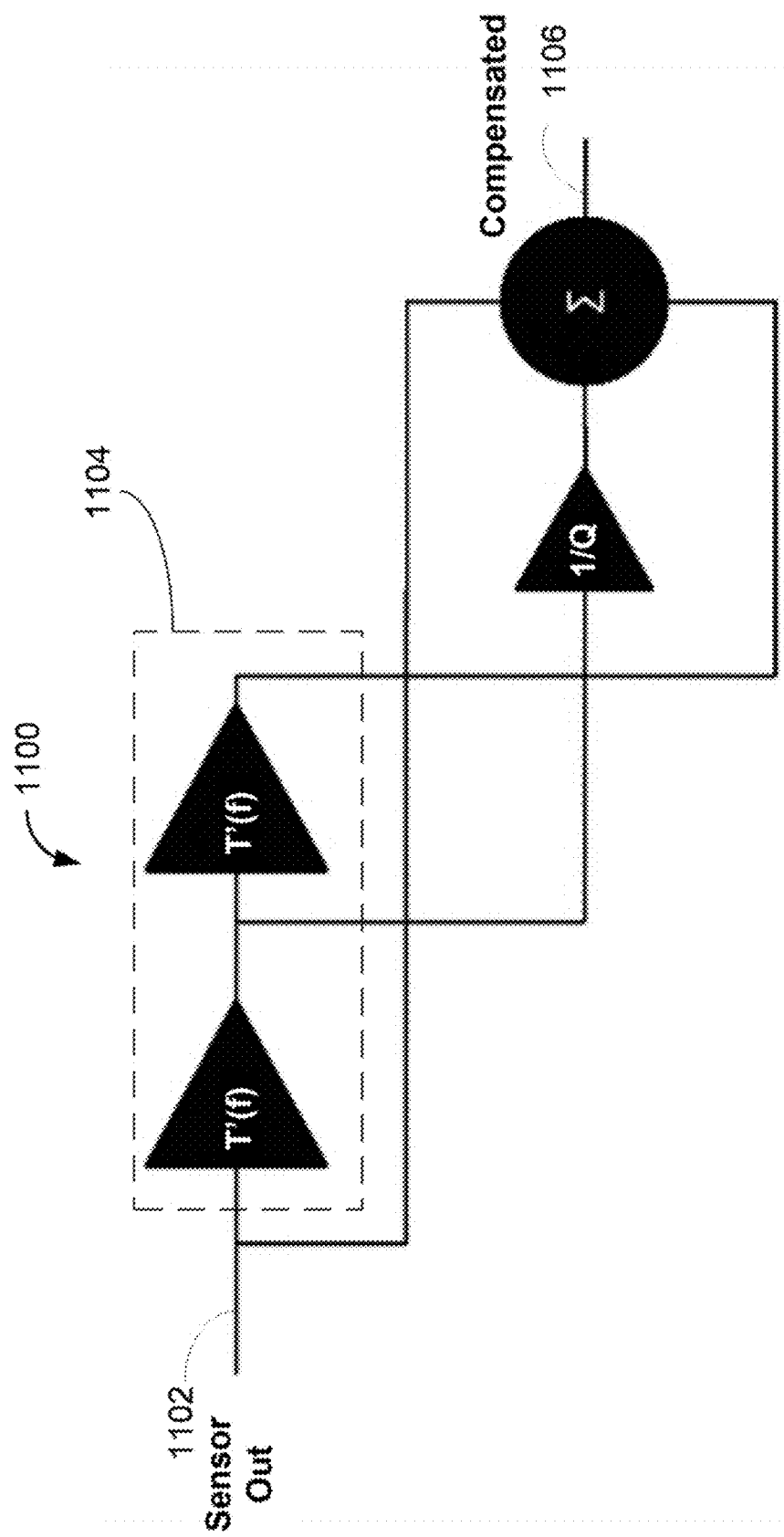
FIG. 11 depicts a block diagram of a seismic mass resonance compensator, according to an example implementation of the disclosed technology.

FIG. 11 shows a block diagram representation of a seismic mass compensator, according to an example implementation of the disclosed technology. In one example implementation, the sensor output 1102 may be fed to cascaded differentiators 1104 whose outputs are summed with the sensor output to produce a compensated output 1106 for the response. This implementation of compensation may be effective to the extent that the sensor response can be modeled as a second order system, and accurate characterization of the sensor Q and $f_n$.

Since differentiators have increasing gain proportional to frequency, the circuit shown in FIG. 11 may have certain noise and stability issues. In certain example implementations, the sensor response may not be meaningful beyond 80% of the resonant frequency, and in such cases, the compensator response may be rolled off (i.e., reduced) for frequencies beyond the useful frequency range. For example, the high frequency response may be rolled-off starting near the resonant frequency to improve phase margin and to reduce noise. In certain example implementations, a low pass filter may be utilized in conjunction with the compensation circuit to roll-of the high frequencies above the useful range. In one example implementation, a multi-pole low pass filter (not shown) may be utilized in conjunction with the compensation circuit. In one example implementation, a 6-pole low pass filter may be used to provide about 48 dB/octave roll-off with a knee at or near the resonance Other filters, as known to those having skill in the art, may be used accordingly to improve the noise and stability of the compensator.

Figure 12:
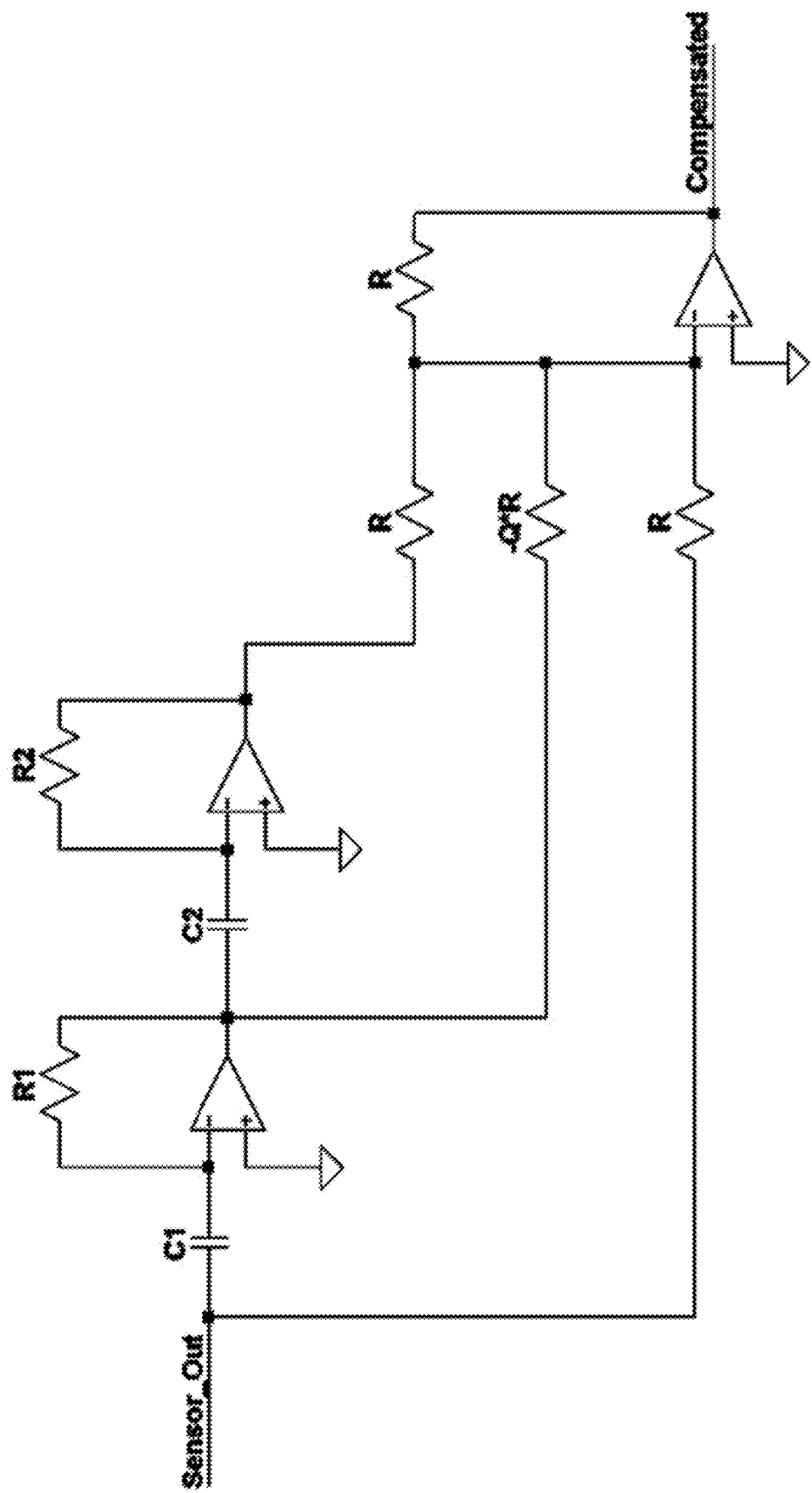
FIG. 12 depicts a compensator circuit corresponding to an implementation of the block diagram shown in FIG. 11, according to an example implementation of the disclosed technology.

FIG. 12 shows a circuit implementation of the cascaded differentiator compensator, as depicted in the block diagram of FIG. 11, according to an example implementation of the disclosed technology.

Figure 13:
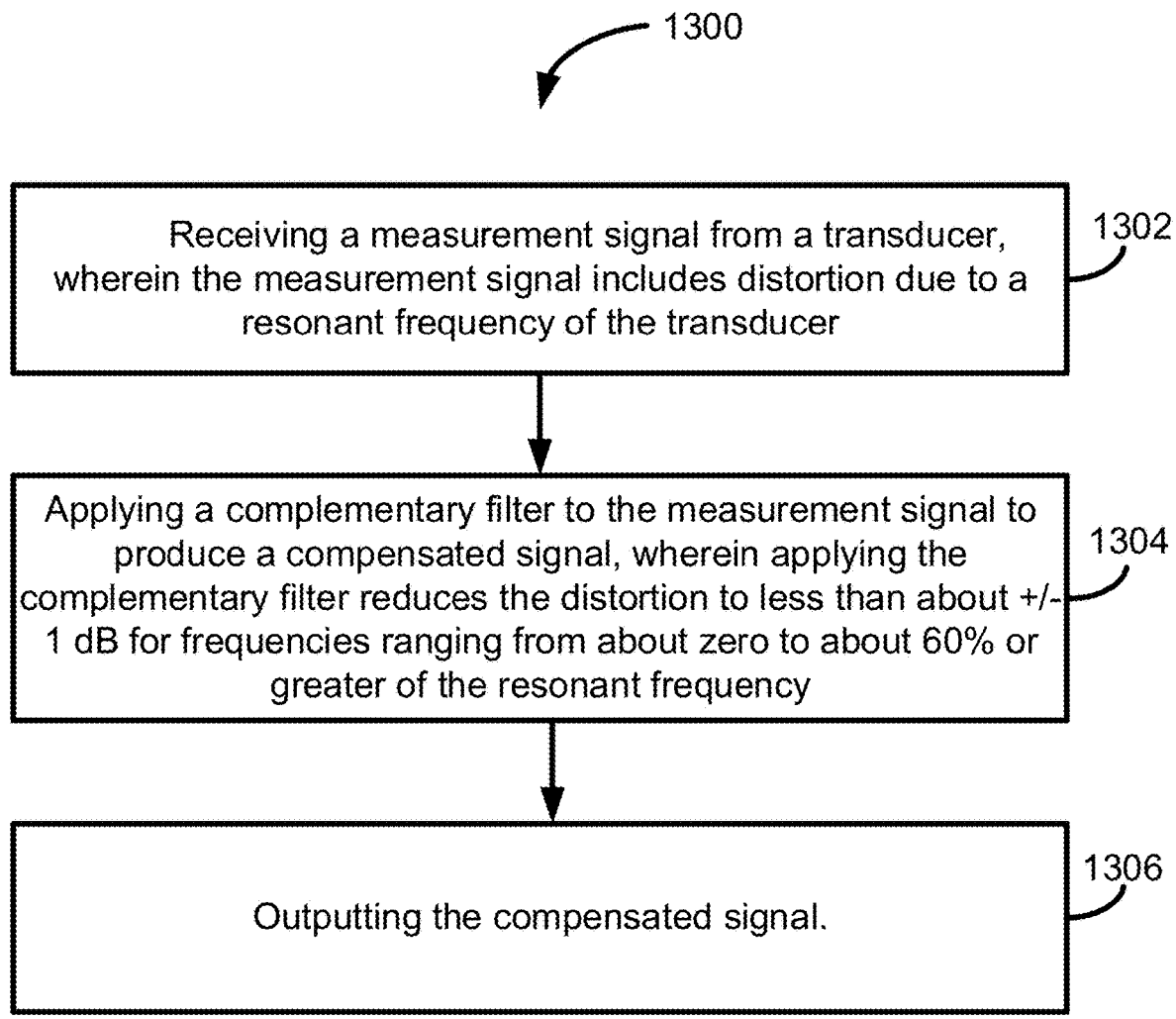
FIG. 13 depicts a flow diagram of a method according to an example implementation of the disclosed technology.

FIG. 13 is a flow diagram of a method 1300, according to an example implementation of the disclosed technology. In block 1302, the method 1300 includes receiving a measurement signal from a transducer, wherein the measurement signal includes distortion due to a resonant frequency of the transducer. In block 1304, the method 1300 includes applying a complementary filter to the measurement signal to produce a compensated signal, wherein applying the complementary filter reduces the distortion to less than about +1 dB for frequencies ranging from about zero to about 60% or greater of the resonant frequency. In block 1306, the method 1300 includes outputting the compensated signal.

The disclosed technology may increase the limits of the usable frequency response of transducers beyond the customary threshold of 20% of the resonant frequency to potentially approximately 80% or beyond. Certain example implementations of the disclosed technology may provide extended usable frequency response of packaged and/or mounted transducers.

In certain example implementations, applying a filter to the measurement signal can include applying a filter having a frequency response based on an inverse frequency response of the transducer. Certain example implementations may include determining the resonant frequency associated with a frequency response of the transducer. Certain example implementations may include determining the compensating filter having a frequency response complementary to the frequency response of the transducer.

In accordance with an example implementation of the disclosed technology, a quality factor associated with a frequency response of the transducer may be determined. Certain example implementations may include determining the compensating filter having a frequency response and quality factor complementary to the frequency response of the transducer.

Certain example implementations of the disclosed technology include filter. The filter can include a measurement input terminal adapted to receive a measurement signal from a transducer. The measurement signal can include a distortion due to a resonant frequency associated with the transducer. The filter can include a compensation circuit adapted to receive and compensate the measurement signal and to reduce the distortion to less than about +/−1 dB for frequencies ranging from about zero to about 60% or greater of the resonant frequency. The filter can include an output terminal for outputting the compensated measurement signal.

According to an example implementation of the disclosed technology, the filter can include a compensation circuit having a frequency response characteristic of:

$$T_C(f) = \frac{-f^2 + \frac{iff_n}{Q} + f_n^2}{-f^2 + iff_n + f_n^2},$$

wherein f is the frequency variable, $f_n$ is the resonant frequency of the transducer, and Q is a quality factor associated with the transducer frequency response.

According to an example implementation of the disclosed technology, the filter can include a compensation circuit that can be represented by a frequency response characteristic of:

$$T_C(f) = \frac{-f^2 + \frac{iff_n}{Q} + f_n^2}{f_n^2},$$

wherein f is the frequency variable, $f_n$ is the resonant frequency of the transducer, and Q is a quality factor associated with the transducer frequency response.

In certain example embodiments, the transducer may include a diaphragm having a resonant frequency modeled by:

$$f = \frac{36}{2\pi} \sqrt{\frac{Et^2}{12\rho a^4(1-v^2)}},$$

wherein the diaphragm is flat and square having a length a, and thickness t, and where E is Young's modulus, v is Poisson's ratio of the diaphragm material, and ρ is the applied pressure measured in Pascals. Certain example implementations of the filter may include the transducer.

According to an example implementation of the disclosed technology, the compensation circuit associated with the filter may further reduce the distortion to less than about +/−2 dB for frequencies ranging from about 60% to about 90% of the resonant frequency. In certain example implementations, the compensation circuit associated with the filter may further reduce the distortion to less than about +/−3 dB for frequencies ranging from about 90% to about 100% of the resonant frequency. In other example implementations, filters and/or compensation circuitry may be employed to reduce the distortion over a range of between about +/−0.5 to about +/−6 dB for frequencies ranging from about 50% to about 100% of the resonant frequency of a transducer. In certain example implementations, the ability to correct resonance may be controlled by how accurately the resonance characteristics can be measured and how stable they are.

Certain example implementations of the disclosed technology may include a compensated transducer. In certain example implementations, the (uncompensated) transducer may include a diaphragm. In certain example implementations, the transducer may include one or more piezoresistors, a piezoelectric crystal, and/or capacitive elements in communication with the diaphragm. In certain example implementations, the transducer may also include a housing that can include one or more of a cavity, a mounting substrate, mounting screws, etc.

According to certain example implementations, a filter is disclosed that may include an input terminal configured to receive a measurement circuit, for example, from a transducer. In certain example implementations, the measurement signal can include distortion due, for example, to a resonant frequency associated with the transducer. In certain example implementations, the filter can include a compensation circuit configured to receive the measurement signal and reduce the distortion to less than about +/−1 dB for frequencies ranging from about zero to about 60% or greater of the resonant frequency. In certain example implementations, the compensation circuit may include an output terminal adapted for outputting the compensated signal.

In certain example implementations, the compensation circuit may be configured with a frequency response that is inverse or complementary to the frequency response of the (uncompensated) transducer. In certain example implementations, the compensation circuit may be configured with an anti-resonant frequency corresponding to a resonant frequency of the (uncompensated) transducer. In certain example implementations, the compensation circuit may be configured with a quality factor that is about equal or complementary to a quality factor associated with the (uncompensated) transducer.

According to an example implementation of the disclosed technology, the compensation circuit may reduce the distortion to less than about +/−2 dB for frequencies ranging from about 60% to about 90% of the resonant frequency.

In certain example implementations, the compensation circuit may include a low-pass filter configured to attenuate the measurement signal or the compensated signal frequencies above the resonant frequency. In one example implementation, the low-pass filter may include a 6 pole filter having about a 48 dB/octave roll-off.

In certain example implementations, the measurement signal can include a pressure measurement signal. In certain example implementations, the transducer may be an accelerometer. According to an example implementation of the disclosed technology, the transducer may include a diaphragm. In certain example implementations, the transducer may include one or more piezoresistive elements in communication with the diaphragm. In certain example implementations the transducer can include one or more of a cavity and a mounting substrate.

In accordance with an example implementation of the disclosed technology, the compensation circuit may include analog circuitry or components. In certain example implementations, the compensation circuit may include digital circuitry or components.

In certain example implementations, the compensation circuit can include one or more of an amplifier, a summing block, an integrator, and a band-pass filter.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
receiving, responsive to an applied pressure, an electrical measurement signal from a sensor having a protective screen, wherein the measurement signal includes a distortion due to the protective screen;
applying, to the measurement signal, a complementary compensation filter circuit adapted to compensate for the distortion in the measurement signal, wherein applying the complementary compensation filter circuit reduces the distortion to less than 1 dB for frequencies ranging from zero up to 60% of a resonant frequency and less than 2 dB for frequencies ranging from over 60% to 90% of the resonant frequency; and
outputting the compensated signal, wherein the compensated signal reduces a resonance associated with the sensor.

2. The method of claim 1, wherein applying the complementary compensation filter circuit to the measurement signal comprises applying a second order transfer function to the measurement signal to produce a compensated frequency response signal filter having a frequency response based on an inverse frequency response of the sensor, wherein the second order transfer function is implemented by a double integrator with feedback.

3. The method of claim 1, further comprising:
determining the resonant frequency associated with a frequency response of the sensor; and
determining a quality factor complementary to the frequency response of the sensor.

4. The method of claim 3, further comprising:
determining a compensated frequency response of the sensor based on one or more of the determined resonant frequency and the determined quality factor.

5. The method of claim 1, wherein the complementary compensation filter circuit is an analog circuit.

6. The method of claim 1, wherein the complementary compensation filter circuit includes a Helmholtz frequency response, $T_c(f)$, represented by the equation:

$$T_C(f) = \frac{-f^2 + \frac{iff_n}{Q} + f_n^2}{-f^2 + iff_n + f_n^2}$$

wherein f is a frequency variable, $f_n$ is the resonant frequency of the sensor, and Q is a quality factor associated with the sensor frequency response.

7. The method of claim 1, wherein the complementary compensation filter circuit includes a seismic mass frequency response, $T_c(f)$, represented by the equation:

$$T_C(f) = \frac{-f^2 + \frac{iff_n}{Q} + f_n^2}{f_n^2}$$

wherein f is the frequency variable, $f_n$ is the resonant frequency of the sensor, and Q is a quality factor associated with the sensor frequency response.

8. The method of claim 1, wherein the sensor comprises a diaphragm having a resonant frequency modeled by $$f = \frac{36}{2\pi}\sqrt{\frac{Et^2}{12\rho a^4(1-v^2)}}$$

and wherein the diaphragm is flat and square having a length a and thickness t, and where E is Young's modulus, v is Poisson's ratio of the diaphragm material, and ρ is the applied pressure measured in Pascals.

9. The method of claim 1, wherein the distortion is further due to a resonance of the sensor.

10. A filter comprising:
a measurement input terminal adapted to receive an electrical measurement signal from a sensor having a protective screen responsive to a pressure applied to a diaphragm of the sensor, wherein the measurement signal includes a distortion due to the protective screen associated with the sensor;
a complementary filter compensation circuit adapted to compensate for the distortion in the measurement signal, the complementary filter compensation circuit adapted to receive and compensate a frequency response of the measurement signal and to reduce the distortion to less than 1 dB for frequencies ranging from zero up to 60% of a resonant frequency and less than 2 dB for frequencies ranging from over 60% to 90% of the resonant frequency; and
an output terminal for outputting the compensated signal, wherein the compensated signal reduces a resonance associated with the sensor.

11. The filter of claim 10, wherein the compensation circuit comprises second order transfer function implemented by a double integrator with feedback.

12. The filter of claim 10, wherein a response of the compensation circuit is configured based on one or more of the resonant frequency and a quality factor associated with the sensor.

13. The filter of claim 10, wherein the compensation circuit comprises a Helmholtz frequency response, $T_c(f)$, represented by the equation:

$$T_C(f) = \frac{-f^2 + \frac{if f_n}{Q} + f_n^2}{-f^2 + if f_n + f_n^2}$$

wherein f is the frequency variable, $f_n$ is the resonant frequency of the sensor, and Q is a quality factor associated with a frequency response of the sensor.

14. The filter of claim 10, wherein the compensation circuit comprises a seismic mass frequency response, $T_c(f)$, represented by the equation:

$$T_C(f) = \frac{-f^2 + \frac{if f_n}{Q} + f_n^2}{f_n^2}$$

wherein f is the frequency variable, $f_n$ is the resonant frequency of the sensor, and Q is a quality factor associated with a frequency response of the sensor.

15. The filter of claim 10, further comprising a sensor, wherein the sensor comprises a diaphragm having a resonant frequency modeled by $$f = \frac{36}{2\pi} \sqrt{\frac{Et^2}{12\rho a^4 (1-v^2)}}$$

wherein the diaphragm is flat and square having a length a and thickness t, and where E is Young's modulus, ν is Poisson's ratio of the diaphragm, and ρ is an applied pressure measured in Pascals.

16. The filter of claim 10, wherein the compensation circuit comprises a low-pass filter configured to attenuate measurement signal frequencies or compensated signal frequencies above the resonant frequency.

17. The filter of claim 16, wherein the low-pass filter comprises a 6-pole filter having a 48 dB/octave roll-off.

18. The filter of claim 10, further comprising a sensor, wherein the sensor comprises an accelerometer.

19. The filter of claim 18, wherein the sensor includes one or more piezoresistive elements in communication with a diaphragm.

20. The filter of claim 10, wherein the compensation circuit is an analog circuit comprising one or more of an amplifier, a summing block, an integrator, and a band-pass filter.

* * * * *